United States Patent
Iijima et al.

(10) Patent No.: US 7,791,985 B2
(45) Date of Patent: Sep. 7, 2010

(54) OBJECTIVE LENS DRIVING APPARATUS

(75) Inventors: Akira Iijima, Gunma (JP); Noboru Onojima, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 567 days.

(21) Appl. No.: 11/743,113

(22) Filed: May 1, 2007

(65) Prior Publication Data

US 2007/0263495 A1 Nov. 15, 2007

(30) Foreign Application Priority Data

May 12, 2006 (JP) .............................. 2006-133715

(51) Int. Cl.
*G11B 7/00* (2006.01)
(52) U.S. Cl. ................. 369/44.15; 369/44.22
(58) Field of Classification Search .............. 369/44.15, 369/13.23, 149, 44.22, 114
See application file for complete search history.

(56) References Cited

U.S. PATENT DOCUMENTS 6,721,110 B2 * 4/2004 Song et al. .................. 359/814

2005/0007906 A1 * 1/2005 Horinouchi et al. ...... 369/44.37
2005/0185530 A1 * 8/2005 Akanuma ................. 369/44.15

FOREIGN PATENT DOCUMENTS

JP 2001-222830 8/2001

OTHER PUBLICATIONS

State Intellectual Property Office of the P.R.C., Notification of an Office Action for Chinese Application No. 2007-101029242 Mail Date Feb. 12, 2010.

* cited by examiner

Primary Examiner—Wayne R Young
Assistant Examiner—Aneeta Yodichkas
(74) Attorney, Agent, or Firm—SoCal IP Law Group LLP; Steven C. Sereboff; John E. Gunther

(57) ABSTRACT

An objective lens driving apparatus comprising: an actuator movable unit that is configured such that a driving coil is mounted on a lens holder with an objective lens, and is supported on an actuator frame displaceably and elastically; a magnetic circuit that includes a magnet fixed to the actuator frame to form an effective magnetic field for the driving coil; and a rolling canceling coil that is so mounted on the lens holder as to act on the effective magnetic field formed by the magnetic circuit so effectively that a driving force is generated in a tilt direction that cancels rolling generated when a drive signal is supplied to a tracking coil to drive the actuator movable unit in a tracking direction.

15 Claims, 7 Drawing Sheets

OBJECTIVE LENS DRIVING APPARATUS

CROSS-REFERENCE TO RELATED APPLICATION

This application claims the benefit of priority to Japanese Patent Application No. 2006-133715, filed May 12, 2006, of which full contents are incorporated herein by reference.

BACKGROUND OF THE INVENTION

1. Field of the Invention

The present invention relates generally to an objective lens driving apparatus with an actuator movable unit which is supported on an actuator frame displaceably and elastically, the unit being configured such that a driving coil is mounted on a lens holder including an objective lens, and, more particularly, to an objective lens driving apparatus that cancels rolling generated when an actuator movable unit is driven in a tracking direction.

2. Description of the Related Art

In an objective lens driving apparatus in an optical head that optically reads or writes signals from or to an optical disc, as is well known, an actuator movable unit is mounted with a focus coil and a tracking coil, or a tilt coil as needed, on a lens holder with an objective lens attached therein and is displaceably supported by an actuator frame; an effective area of each driving coil of the actuator movable unit is located within a predetermined magnetic field formed by a magnetic circuit; and therefore, the objective lens is driven in a focus direction and a tracking direction or a tilt direction as needed, in accordance with a drive signal supplied to each driving coil.

In the objective lens driving apparatus, since the objective lens is mounted on the top surface of the lens holder such that the objective lens is located closer to a disc, and due to the arrangement of each driving coil and the configuration of the magnetic circuit, the center of gravity of the actuator movable unit generally deviates in the vertical direction, i.e., the light axis direction of the objective lens, from the point of action of the driving force generated by driving the actuator movable unit in the tracking direction, and when the actuator movable unit is driven in the tracking direction, rolling is generated which is lateral swinging of rotational motion of the actuator movable unit in a radial direction of the disc.

To prevent the rolling, in a known objective lens driving apparatus, the placement location of the tracking coil and the configuration of the magnetic circuit generating a magnetic flux applied to the tracking coil are devised to supply the drive signal to the tracking coil, such that a driving force is generated in a direction preventing the rolling, along with the driving force in the tracking direction (see patent document 1).

In the objective lens driving apparatus using the driving force of the electromagnetic force to prevent the rolling, since no counter weight is added to the under side of the lens holder to keep a weight balance of the actuator movable unit, deterioration of sensitivity due to the increase in the weight of the actuator movable unit is prevented (see, e.g., Japanese Patent Application Laid-Open Publication No. 2001-222830).

In the objective lens driving apparatus shown in patent document 1, since a tracking coil is needed at each side of a side surface of the lens holder facing to a magnet effective surface and a magnetic pole having reverse polarity must be magnetized obliquely with respect to the focus direction on the magnet effective surface, it is problematic that the magnetic circuit has many restrictions.

Since the boundary of the magnetic pole is oblique on the magnet effective surface, if the actuator movable unit is displaced in the tracking and focusing directions, a positional relationship between the magnetic pole of the magnet effective surface and an effective side of each tracking coil becomes unbalanced in each tracking coil. That is, if the actuator movable unit is displaced in the tracking direction, a positional relation of each tracking coil relative to the magnetic pole boundary is changed depending on this displacement. Therefore, the driving force generated by each tracking coil for preventing the rolling becomes unbalanced, and moment is generated around the center of gravity of the actuator movable unit.

Therefore, since an electromagnetic force is generated by the drive signal supplied to each tracking coil and the moment generated around the center of gravity of the actuator movable unit is changed, the rolling cannot sufficiently prevented and a fundamental solution cannot be achieved.

SUMMARY OF THE INVENTION

To solve the above problem, the main aspect of the present invention provides an objective lens driving apparatus comprising: an actuator movable unit that is configured such that a driving coil is mounted on a lens holder with an objective lens, and is supported on an actuator frame displaceably and elastically; a magnetic circuit that includes a magnet fixed to the actuator frame to form an effective magnetic field for the driving coil; and a rolling canceling coil that is so mounted on the lens holder as to act on the effective magnetic field formed by the magnetic circuit so effectively that a driving force is generated in a tilt direction that cancels rolling generated when a drive signal is supplied to a tracking coil to drive the actuator movable unit in a tracking direction.

In the objective lens driving apparatus of the present invention, a driving force is generated in the tilt direction that cancels the rolling in accordance with the drive signal supplied to the rolling canceling coil when the actuator movable unit is driven in the tracking direction. Therefore, the rolling can be prevented which is caused by the displacement of the actuator movable unit in the tracking direction at the time of the tracking control.

In this case, by supplying the drive signal supplied to the tracking coil also to the rolling canceling coil, the driving force can appropriately b generated in the direction canceling the rolling in accordance with the displacement amount in the tracking direction and the displacement direction of the actuator movable unit, and a dedicated drive signal is not necessary for the rolling canceling coil.

In the case of the objective lens driving apparatus disposed with first and second focus coils having the winding center axes orthogonal to the light axis of the objective lens on either side of the tracking coil, by disposing the rolling canceling coil over each focus coil, a dedicated bobbin portion for winding each rolling canceling coil is not needed, and the magnet poles of the magnet generating the effective magnetic flux for each focus coil are also used for each rolling canceling coil, which is rational.

When the objective lens driving apparatus includes a first tilt coil and a second tilt coil wound around the lens holder along the side surfaces of the lens holder at positions shifted from each other in the light axis direction of the objective lens, this configuration is advantageous to dispose the rolling canceling coil on a side surface of the lens holder. By setting the effective side areas of the rolling canceling coils at positions substantially overlapping the tilt coils, the magnet poles of the magnet generating the effective magnetic flux for each rolling canceling coil are also used for each tilt coil, which is rational.

By winding the tilt coil around the lens holder along the side surfaces of the lens holder, when the tracking coils and the rolling canceling coils are disposed on both sides of the lens holder, all the tracking coils and all the rolling canceling coils can be linked along the tilt coils, and the linking portions of these driving coils can orderly be handled.

Other features of the present invention will become apparent from the accompanying drawings and the content of the description.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

Figure 1:
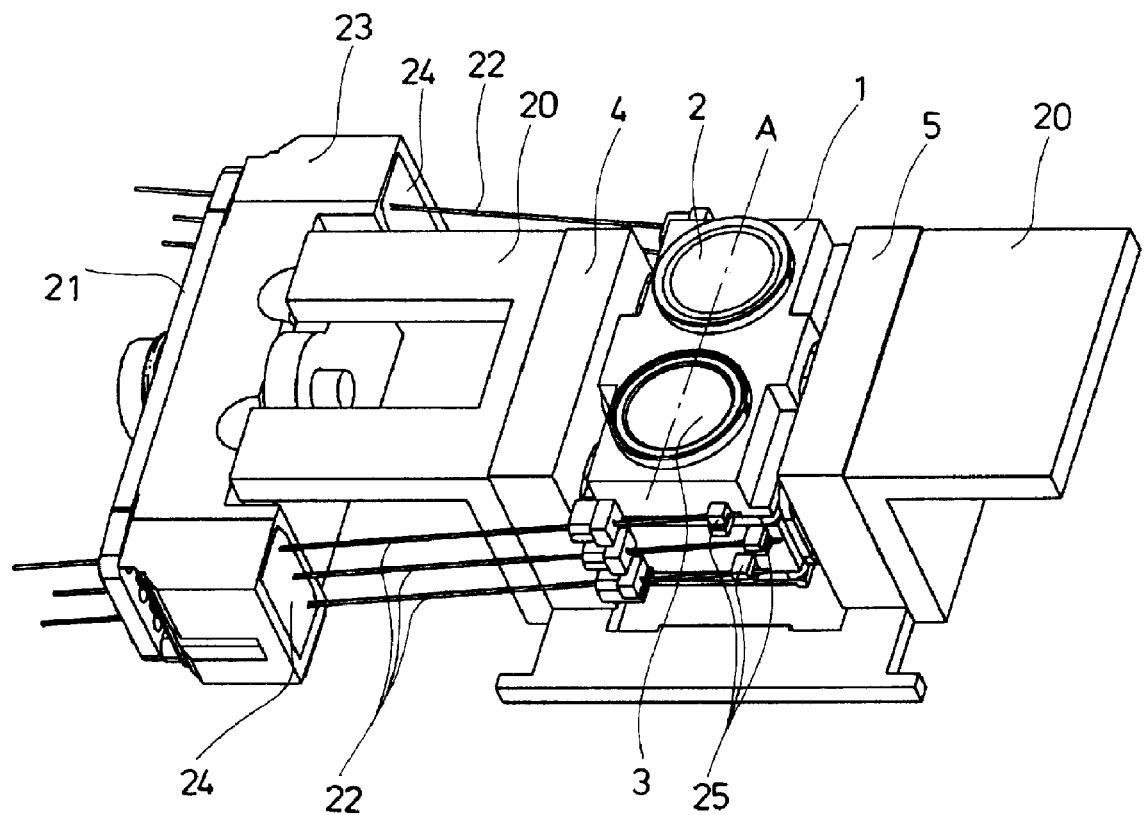
FIG. 1 is a perspective view of a completed state of an example of an objective lens driving apparatus according to the present invention.
Figure 2:
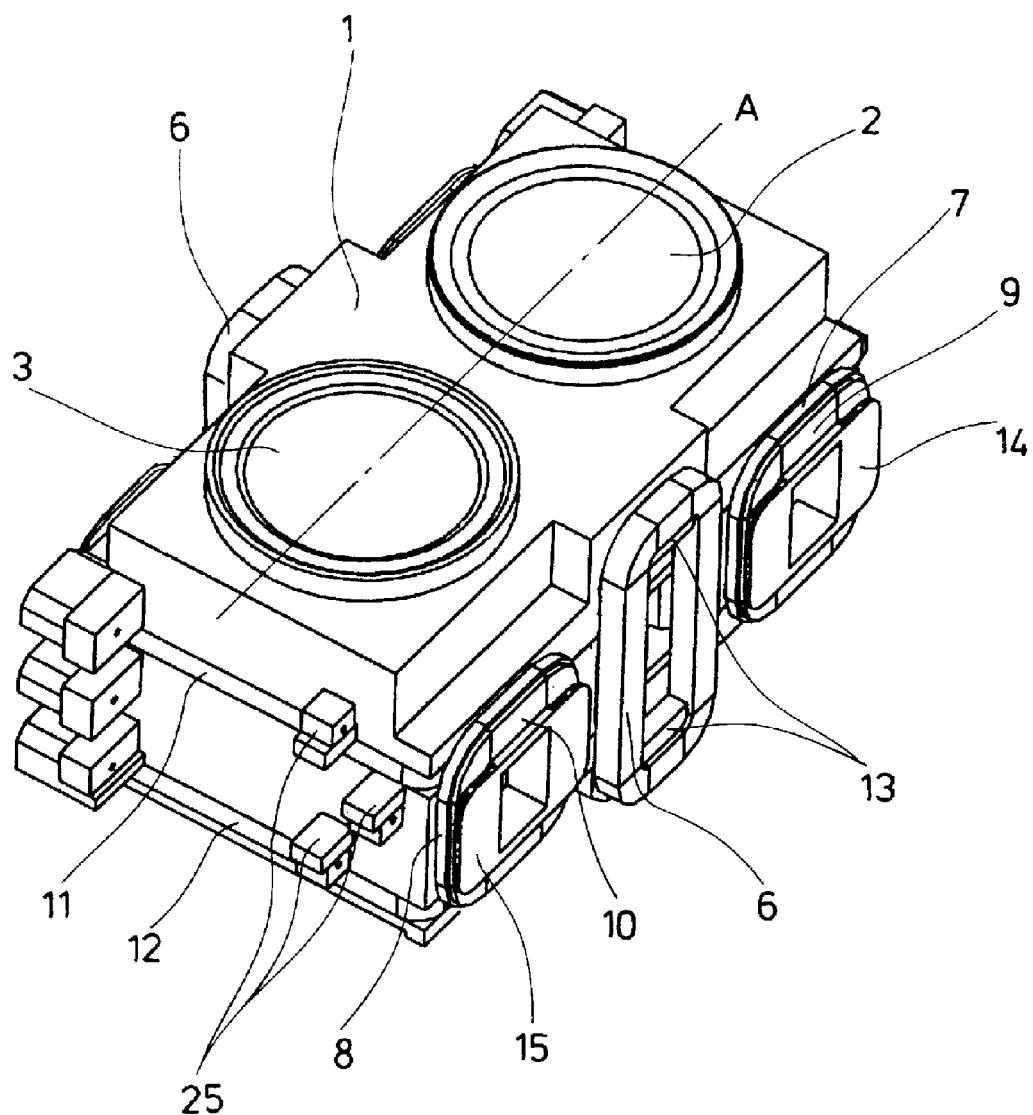
FIG. 2 is a perspective view of a lens holder that is a main portion of the present invention in the objective lens driving apparatus of FIG. 1.
Figure 3:
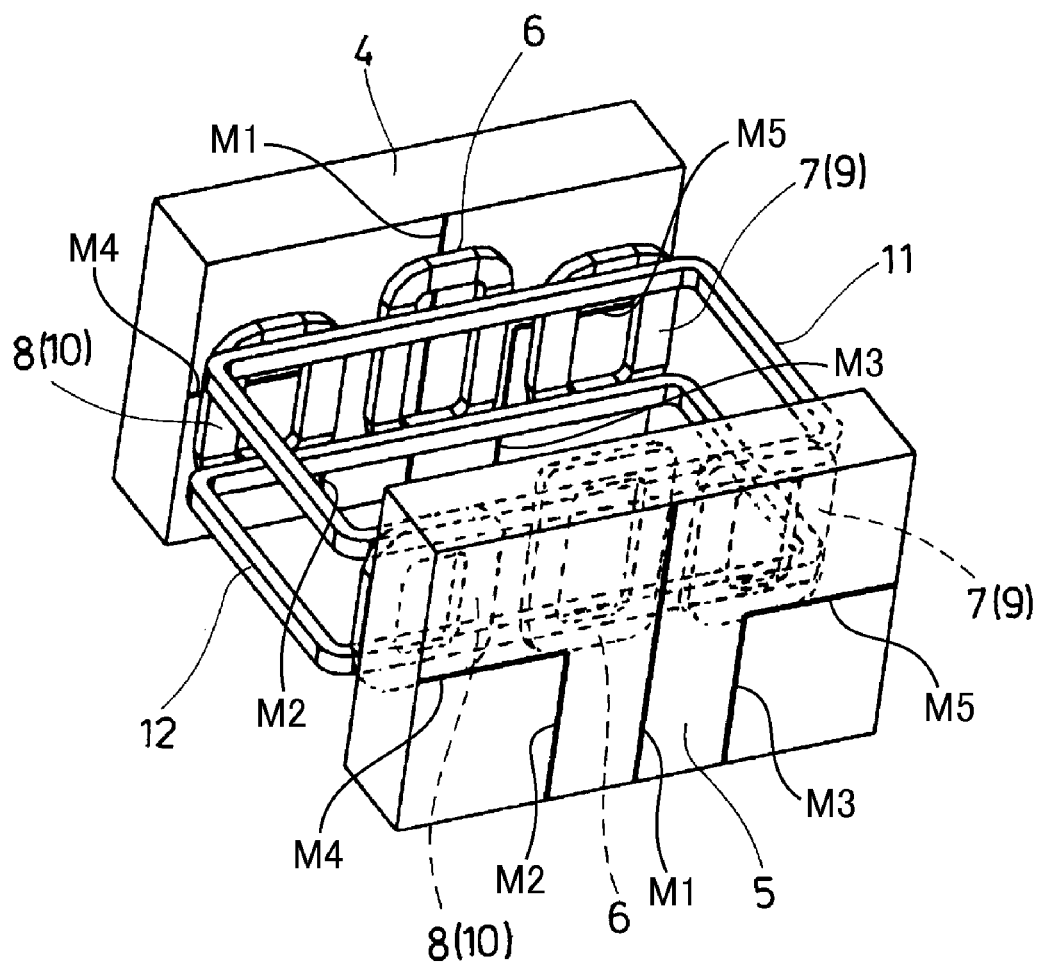
FIG. 3 is a perspective view of a magnetic circuit that is a main portion of the present invention in the objective lens driving apparatus of FIG. 1.

FIG. 1 is a perspective view of a completed state of an example of an objective lens driving apparatus according to the present invention; FIG. 2 is a perspective view of a lens holder that is a main portion of the present invention in the objective lens driving apparatus of FIG. 1; and FIG. 3 is a perspective view of a magnetic circuit that is a main portion of the present invention in the objective lens driving apparatus of FIG. 1.

A lens holder 1 is disposed with a first objective lens 2 and a second objective lens 3 having numerical apertures corresponding respectively to optical discs with different recording densities along the tracking direction.

A pair of magnets 4 and 5 is disposed to be opposed to each other in the tracking direction and in the direction orthogonal to the focusing direction, between which the lens holder 1 is located, and the magnets 4 and 5 are disposed line symmetrically with respect to a virtual line A in the tracking direction passing through the light axis of the objective lens 2 (or objective lens 3).

As to each side surface of the lens holder 1 orthogonal to the tracking direction: a tracking coil 6 is mounted on the center portion thereof, which has a winding axis in the direction orthogonal to the tracking direction and is wound in a rounded rectangular shape; and a first focus coil 7 and a second focus coil 8 are mounted on both the end portions thereof, each of which has a winding axis in the direction orthogonal to the tracking direction and is wound in a rounded rectangular shape. Each driving coil of the tracking coil 6, the first focus coil 7, and the second focus coil 8 is symmetrically disposed with respect to a virtual line A in the tracking direction passing through the light axis of the objective lens 2 (or objective lens 3).

A first rolling canceling coil 9 as shaped in a rounded rectangle is mounted on the first focus coil 7 in coaxially superposed relation, and a second rolling canceling coil 10 as shaped in a rounded rectangle is mounted on the second focus coil 8 in coaxially superposed relation.

Since the tracking coil 6, the first focus coil 7, the second focus coil 8, the first rolling canceling coil 9, and the second rolling canceling coil 10 are wound in a rounded rectangular shape as above, each driving coil has a linear effective side area that effectively acts on an effective magnetic field formed by a magnetic circuit described later.

The lens holder 1 has a first tilt coil 11 and a second tilt coil 12 wound on the side surfaces thereof respectively, the coils 11, 12 having a winding axis parallel to the light axis direction of the objective lens 2 (or objective lens 3), and being positioned in the light axis direction with an interval therebetween. In the first tilt coil 11 and the second tilt coil 12, two sides orthogonal to the tracking direction are opposed to the effective surfaces of the magnets 4 and 5 and act as the effective side areas.

Figure 4:
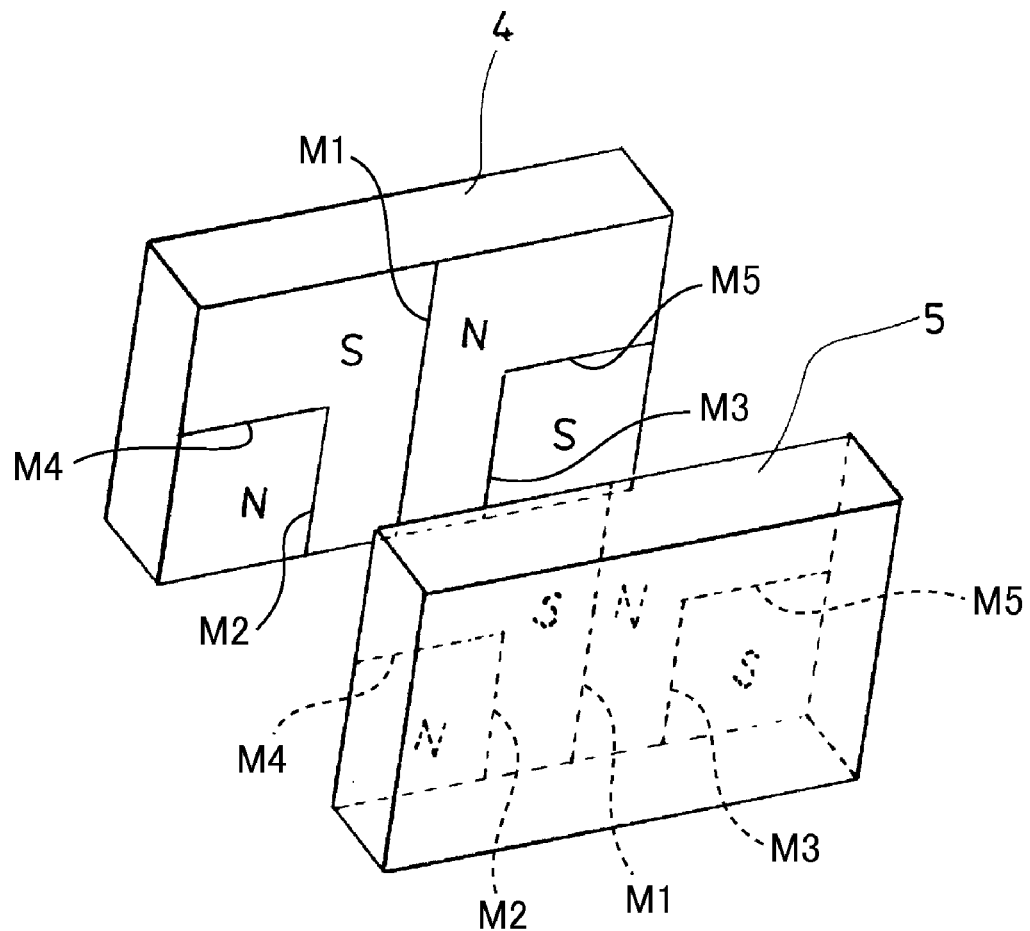
FIG. 4 is an explanatory view of magnetic poles of magnets 4 and 5.

As shown in FIG. 3, a pair of the magnets 4 and 5 is magnetized so as to have a magnetic pole boundary M1 formed at the center in the horizontal direction (the direction orthogonal to the light axis direction of the objective lens), and is set so as to have the north and south poles in the right and left portions as shown in FIG. 4 respectively, which portions are divided by the magnetic pole boundary M1; such that the magnetic pole surfaces of each magnet 4, 5 different in polarity are respectively opposed to the effective side areas of the tracking coil 6 in the light axis direction of the objective lens 2 (or objective lens 3). The magnets 4 and 5 are magnetized so as to have magnetic pole boundaries M4 and M5 formed at the center in the vertical direction (the light axis direction of the objective lens) and to have magnetic pole boundaries M2 and M3 formed in the horizontal direction (the direction orthogonal to the light axis direction of the objective lens), and are set so as to have the south pole in a rectangular shape at a lower right portion of the north pole on the right side as shown in FIG. 4 and so as to have the north pole in a rectangular shape at a lower left portion of the south pole on the left side as shown in FIG. 4; such that the magnetic pole surfaces of each magnet 4, 5 different in polarity are respectively opposed to the effective side areas of the first focus coil 7 and the second focus coil 8 in the direction orthogonal to the light axis direction of the objective lens. Each magnetic pole of a pair of the magnets 4 and 5 is line symmetrically disposed with respect to the virtual line A in the tracking direction passing through the light axis of the objective lens 2 (or objective lens 3) as is the case with each driving coil. In this embodiment, the magnets 4 and 5 are magnetized such that the magnetic pole boundaries M1, M2, M3, M4, and M5 are formed. However, it is not limited to this case. For example, the magnets 4 and 5 can be formed by assembling magnets that are magnetized in advance such that the magnetic pole boundaries M1, M2, M3, M4, and M5 are formed.

Figure 5:
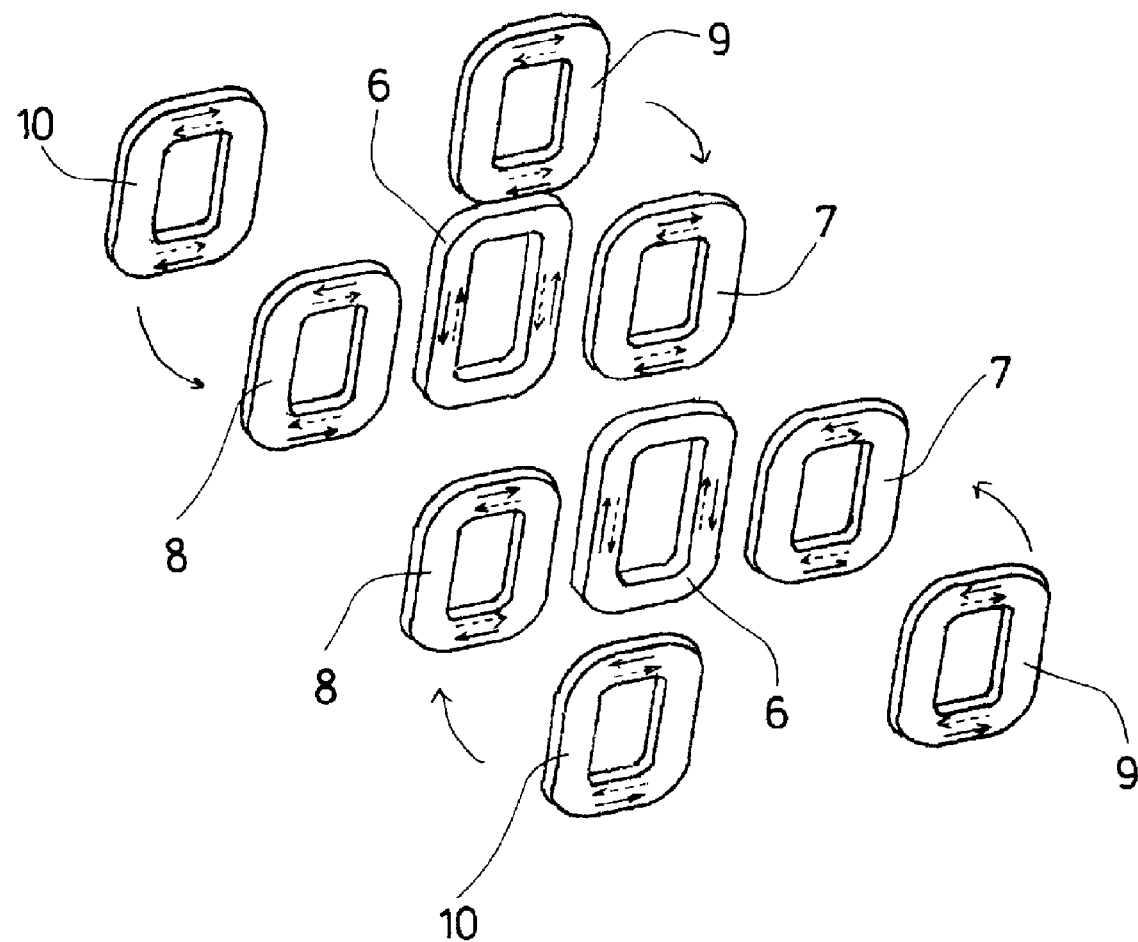
FIG. 5 is an explanatory exploded perspective view of a winding direction of each driving coil.
Figure 6:
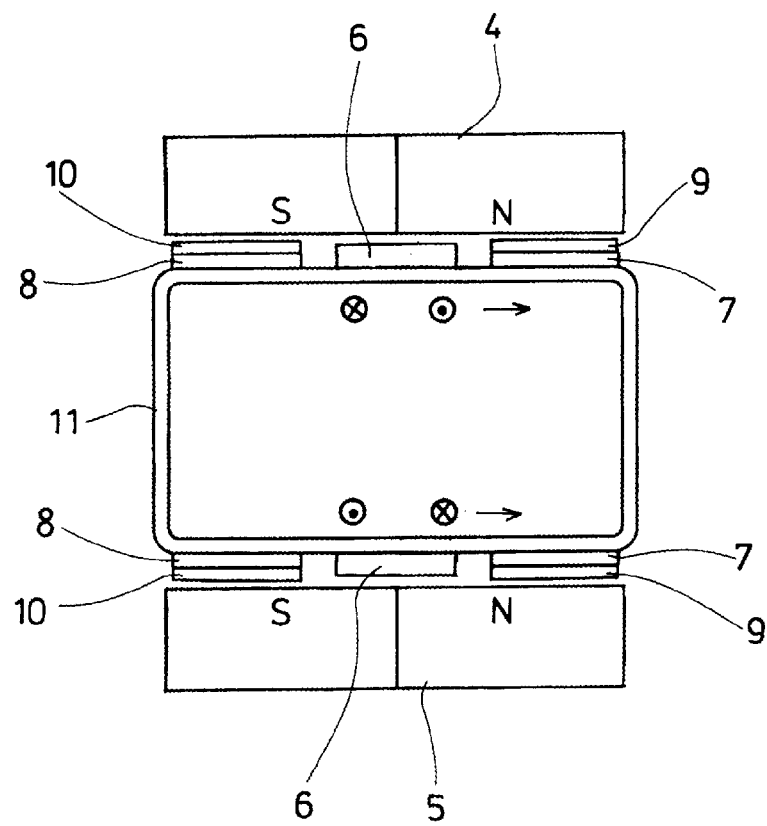
FIG. 6 is a top diagrammatic view of the magnetic circuit.

On the other hand, in each coil on the side surfaces opposed to the magnets 4 and of the lens holder 1, the winding direction is set as shown in an exploded perspective view shown in FIG. 5. That is, the winding directions of the tracking coils 6 are set opposite to each other on the side surfaces of the lens holder 1 as shown by solid-line arrows when viewed from the same direction. Since the winding directions are opposite to each other when viewed from the same direction, the winding directions are the same when viewed from the magnetic pole surface of each corresponding magnet. Since each magnetic pole of a pair of the magnets 4 and 5 is set line symmetrically with respect to the virtual line A, as shown in the top diagrammatic view of the magnetic circuit of FIG. 6, the magnetic flux generated by the magnets 4 and 5 effectively acts on each tracking coil 6 in response to a tracking drive signal supplied to each effective side area in the longitudinal direction of the tracking coil 6 (the light axis direction of the objective lens). Therefore, when the tracking drive signal is supplied to each tracking coil 6, the actuator movable unit is driven in the tracking direction orthogonal to the light axis direction of the objective lens in accordance with the direction of the tracking drive signal. If the tracking drive signal in the direction indicated by circles of FIG. 6 is supplied to each tracking coils 6, the actuator movable unit is driven in the tracking direction to the right side in FIG. 6.

Figure 7:
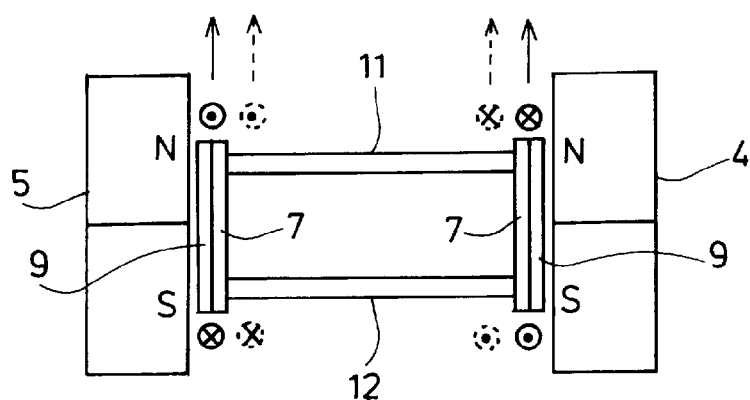
FIG. 7 is a right diagrammatic view of the magnetic circuit.

As shown in FIG. 5, the winding directions of the first focus coils 7 are set opposite to each other on the side surfaces of the lens holder 1 as shown by solid-line arrows when viewed from the same direction. Since the winding directions are opposite to each other when viewed from the same direction, the winding directions are the same when viewed from the magnetic pole surface of each corresponding magnet. As shown in FIG. 7 that is the diagrammatic view of the magnetic circuit of FIG. 6 viewed from the right thereof, each magnetic pole of a pair of the magnets 4 and 5 is configured such that the magnetic flux generated by the magnets 4 and 5 effectively acts on each first focus coil 7 in response to a focus drive signal supplied to each effective side area in the lateral direction of each first focus coil 7 (the direction orthogonal to the light axis direction of the objective lens).

Figure 8:
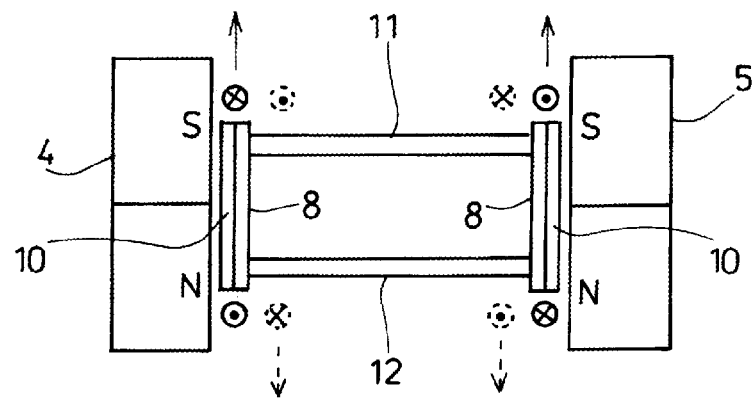
FIG. 8 is a left diagrammatic view of the magnetic circuit.

As shown in FIG. 5, the winding directions of the second focus coils 8 are set opposite to each other on the side surfaces of the lens holder 1 as shown by solid-line arrows when viewed from the same direction. Since the winding directions are opposite to each other when viewed from the same direction, the winding directions are the same when viewed from the magnetic pole surface of each corresponding magnet. As shown in FIG. 8 that is the diagrammatic view of the magnetic circuit of FIG. 6 viewed from the left thereof, each magnetic pole of a pair of the magnets 4 and 5 is configured such that the magnetic flux generated by the magnets 4 and 5 effectively acts on each second focus coil 8 in response to a focus drive signal supplied to each effective side area in the lateral direction of each second focus coil 8 (the direction orthogonal to the light axis direction of the objective lens).

As shown in FIG. 5, the winding directions of the second focus coils 8 are set opposite to the winding directions of the first focus coils 7 disposed on the same side surfaces of the lens holder 1. Since the polarities of the magnetic poles in the magnets 4 and 5 opposed to the first focus coils 7 and the second focus coils 8 are reversed each other, the first focus coils 7 and the second focus coils 8 generate the driving forces in the same focus direction in response to the focus drive signals supplied concurrently.

When the focus drive signals are supplied to each first focus coils 7 and each second focus coils 8 in the directions indicated by solid-line circles of FIGS. 7 and 8, the actuator movable unit is driven in the focus direction to the upper side in FIGS. 7 and 8.

As shown in FIG. 5, the winding directions of the first rolling canceling coils 9 are set opposite to each other on the side surfaces of the lens holder 1 as shown by solid-line arrows when viewed from the same direction. Since the winding directions are opposite to each other when viewed from the same direction, the winding directions are the same when viewed from the magnetic pole surface of each corresponding magnet. As shown in FIG. 7, each magnetic pole of a pair of the magnets 4 and 5 is configured such that the magnetic flux generated by the magnets 4 and 5 effectively acts on each first rolling canceling coils 9 in response to a drive signal supplied to each effective side area in the lateral direction of each first rolling canceling coils 9.

As shown in FIG. 5, the winding directions of the second rolling canceling coils 10 are set opposite to each other on the side surfaces of the lens holder 1 as shown by solid-line arrows when viewed from the same direction. Since the winding directions are opposite to each other when viewed from the same direction, the winding directions are the same when viewed from the magnetic pole surface of each corresponding magnet. As shown in FIG. 8, each magnetic pole of a pair of the magnets 4 and 5 is configured such that the magnetic flux generated by the magnets 4 and 5 effectively acts on each second rolling canceling coils 10 in response to a drive signal supplied to each effective side area in the lateral direction of each second rolling canceling coils 10.

As shown in FIG. 5, the winding directions of the second rolling canceling coils 10 are the same as the first rolling canceling coils 9 disposed on the same side surfaces of the lens holder 1. Since a pair of the magnetic poles in each magnet 4, 5 opposed to the first rolling canceling coil 9 and a pair of the magnetic poles in each magnet 4, 5 opposed to the first rolling canceling coil 10 are different in polarity, the first rolling canceling coils 9 and the second rolling canceling coils 10 generate the driving forces in the opposite focus directions in response to the drive signals supplied concurrently. Therefore, the lens holder 1 is driven in the opposite focus directions with respect to the side thereof disposed with the first rolling canceling coils 9 and the side thereof disposed with the second rolling canceling coils 10, and a driving force is generated to tilt the lens holder 1 in the radial direction of the optical disc.

If the tracking drive signals are supplied to the first rolling canceling coils 9 and the second rolling canceling coils 10 in the directions indicated by dot-line circles of FIGS. 7 and 8, the actuator movable unit generates an upward driving force in the half of the actuator movable unit disposed with the first rolling canceling coils 9 as shown in FIG. 7 and generates a downward driving force in the half of the actuator movable unit disposed with the second rolling canceling coils 10 as shown in FIG. 8.

The first tilt coil 11 and the second tilt coil 12 are wound around the side surfaces of the lens holder 1. The winding directions of the first tilt coil 11 and the second tilt coil 12 are opposite to each other. Each effective side area of the first tilt coil 11 is a portion opposed to each magnet 4, 5. Each effective side area of the first tilt coil 11 is opposed: to a magnetic pole at the right-hand side thereof; and to a magnetic pole different in polarity from the above magnetic pole at the left-hand side thereof, both sides being divided by the magnetic pole boundary M1 at the center in the horizontal direction of the magnets 4 and 5 (the direction orthogonal to the light axis direction of the objective lenses 2 and 3). Each effective side area of the second tilt coil 12 is a portion opposed to each magnet 4, 5. Each effective side area of the second tilt coil 12 is opposed: to a magnetic pole at the right-hand side thereof; and to a magnetic pole different in polarity from the above magnetic pole at the left-hand side thereof, both sides being divided by the magnetic pole boundary M1 at the center in the horizontal direction of the magnets 4 and 5. Each effective side area of the second tilt coil 12 is also opposed: to a magnetic pole at the right-hand side thereof; and to a magnetic pole different in polarity from the above magnetic pole at the left-hand side thereof, both sides being divided by each of the magnetic pole boundaries M2 and M3 except the magnetic pole boundary M1 of the magnets 4 and 5. That is, in terms of the right-hand side and left-hand side divided by each of the magnetic pole boundaries M2 and M3, the magnetic poles of the magnets 4 and 5 opposed to the effective side areas of the second tilt coil 12 are different from the magnetic poles of the magnets 4 and 5 opposed to the effective side areas of the first tilt coil 11.

Therefore, when the tilt drive signal is supplied to the first tilt coil 11 and the second tilt coil 12, the driving forces are generated in the focus directions opposite to each other in the right and the left portions of the effective side areas of the first tilt coil 11 and the second tilt coil 12, the effective side areas divided by the magnetic pole boundary M1 of the magnets 4 and 5. Therefore, the lens holder 1 tilts in the radial direction of the optical disc. In this case, driving forces are generated at the magnetic pole boundaries M2 and M3 portions of the second tilt coil 12 to cancel the tilting driving force at the magnetic pole boundary M1 portion of the effective side areas of the second tilt coil 12, however, in this case, the canceling driving force is sufficiently small relative to the tilting driving force.

When the driving coils are mounted on the lens holder 1, the first tilt coil 11 and the second tilt coil 12 are sequentially wound along the side surfaces of the lens holder 1. The first tilt coil 11 and the second tilt coil 12 are linked.

The first focus coils 7 and the second focus coils 8 are then sequentially wound on the side surfaces of the lens holder 1. Since the first focus coil 7 and the second focus coil 8 disposed on each side surface of the lens holder 1 are linked, a wire of the driving coils is sequentially wound on the first focus coil 7 and the second focus coil 8 on one surface of the lens holder 1 along the first tilt coil 11, and the wire is guided along the first tilt coil 11 to the other surface of the lens holder 1 and is sequentially wound on the second focus coil 8 and the first focus coil 7 on the other surface of the lens holder 1 along the first tilt coil 11.

The tracking coils 6, the first rolling canceling coils 9, and the second rolling canceling coils 10 are then sequentially wound on the side surfaces of the lens holder 1. Each of the tracking coils 6, the first rolling canceling coils 9, and the second rolling canceling coils 10 disposed on each side surface of the lens holder 1 is linked, and the tracking drive signal supplied to each of the tracking coils 6 is also supplied to each of the first rolling canceling coils 9 and the second rolling canceling coil 10. In order to link these driving coils, a wire of each of the driving coils is sequentially wound on the second rolling canceling coil 10, the tracking coil 6, and the first rolling canceling coil 9 on one surface of the lens holder 1 along the second tilt coil 12, and the wire is guided along the second tilt coil 12 to the other surface of the lens holder 1 and is sequentially wound on the first rolling canceling coil 9, the tracking coil 6, and the second rolling canceling coil 10 on the other surface of the lens holder 1 along the second tilt coil 12.

Each driving coil of the tracking coils 6, the first focus coils 7, the second focus coils 8, the first rolling canceling coils 9, and the second rolling canceling coils 10 is formed by winding a wire around a bobbin portion formed on each side surface of the lens holder 1, and each side surface of the lens holder 1 is integrally disposed with a bobbin portion 13 for winding the tracking coil 6, a bobbin portion 14 for coaxially winding the first focus coil 7 and the first rolling canceling coil 9, and a bobbin portion 15 for coaxially winding the second focus coil 8 and the second rolling canceling coil 10.

As described above, the actuator movable unit is configured by the lens holder 1 on which each driving coil is mounted, and the actuator movable unit is displaceably and elastically supported in the focusing, tracking, and radial tilt directions with respect to an actuator frame 20 by support wires 22. The support wires 22 are six wires consisting of three at each side, and each support wire 22 is stretched with one end thereof fixed to the lens holder 1 and the other end thereof fixed to a fixing substrate 21 that is integrally fixed via an auxiliary member 23 to a predetermined side wall of the actuator frame 20.

In this case, the support wires 22 are stretched in a truncated V-shape with the interval therebetween of the lens holder 1 side in the tracking direction slightly narrower than the interval therebetween of the fixing substrate 21 side in the tracking direction such that a natural frequency of the rolling of the actuator movable unit is increased.

The support wires 22 pass through three holes formed in the auxiliary member 23 in each side and are surrounded by the damping agent 24 filled into the holes thereof such that vibrations are suppressed.

With regard to the six support wires 22 displaceably and elastically support the actuator movable unit relative to the actuator frame 20, one each end thereof that is not the other each end thereof fixed to the fixing substrate 21, is disposed in contact with or in the vicinity of predetermined projection 25 formed integrally with each side surface of the lens holder 1. Each end of a wire of each driving coil sequentially wound around the lens holder 1, i.e., the wire of the first tilt coil 11 and the second tilt coil 12, the wires of the first focus coils 7 and the second focus coils 8, and the wires of the tracking coils 6, the first rolling canceling coils 9, and the second rolling canceling coils 10, is coupled to each of the predetermined projects 25. Each of the predetermined support wires 22 is therefore connected to the end of the wire, coupled to each predetermined project 25, of each driving coil by means of soldering, such that the predetermined support wires 22 are associated with the predetermined driving coils respectively.

Therefore, the drive signal is supplied to each driving coil via the predetermined support wires 22. For example, the tilt drive signal is supplied to the first tilt coil 11 and the second tilt coil 12 via the support wires 22 disposed in the middle in the vertical direction of each of the right and the left side surface, and the focus drive signal is supplied to the first focus coils 7 and the second focus coils 8 via the support wires 22 disposed at the top and the bottom of one side surface. The tracking drive signal is supplied to the first rolling canceling coils 9 and the second rolling canceling coils 10 via the support wires 22 disposed at the top and bottom of the other side surface.

When the tilt drive signal is supplied to the first tilt coil 11 and the second tilt coil 12, the driving forces are generated in the effective side areas of the first tilt coil 11 and the second tilt coil 12, which driving forces on both sides about the center of the effective side area are in the focus directions opposite to each other. Therefore, the actuator movable unit is driven in the radial skew direction corresponding to the polarity of the tilt drive signal by a displacement amount according to the current amount of the tilt drive signal.

When the focus drive signal is supplied to the first focus coils 7 and the second focus coils 8, the driving force is generated in each first focus coil 7 and each second focus coil 8 in the same focus direction. Therefore, the actuator movable unit is driven in the focus direction corresponding to the polarity of the focus drive signal by a displacement amount according to the current amount of the focus drive signal.

When the tracking drive signal is supplied to the tracking coils 6, the driving force is generated in each tracking coil 6 in the same tracking direction. Therefore, the actuator movable unit is driven in the tracking direction corresponding to the polarity of the tracking drive signal by a displacement amount according to the current amount of the tracking drive signal.

Figure 9:
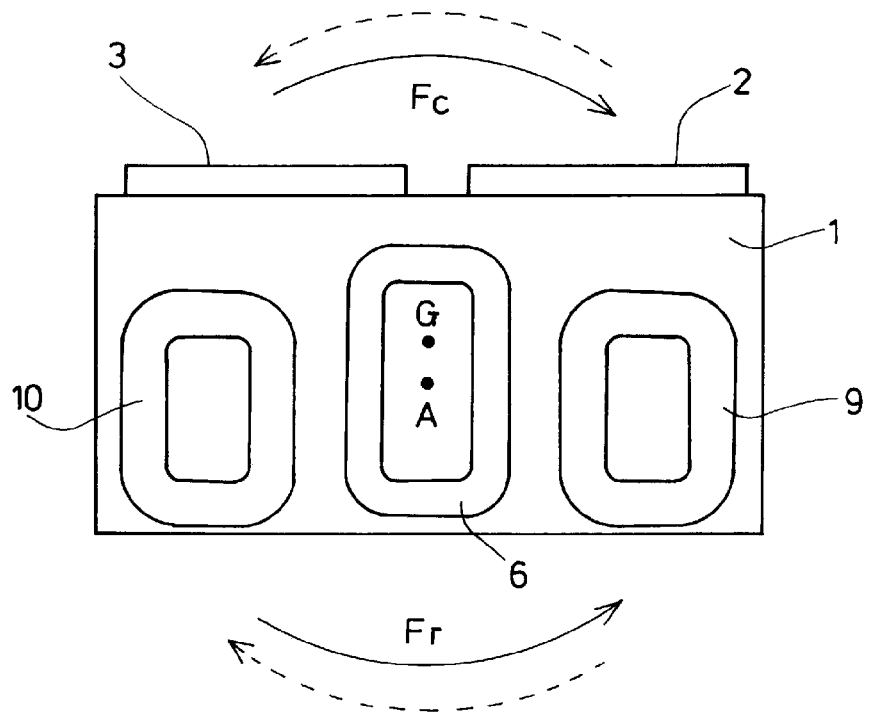
FIG. 9 is an explanatory view of a driving force generated when rolling of an actuator movable unit is prevented from being generated.

In the objective lens driving apparatus of the embodiment, as shown in FIG. 9, since the two objective lenses 2 and 3 corresponding to different optical disc standards are mounted on the top surface of the lens holder 1 such that the objective lenses are located closer to a disc, and due to the configuration of the lens holder 1, the arrangement of each driving coil, and the configuration of the magnetic circuit, the center of gravity G of the actuator movable unit is located in a biased position that is closer to the top surface with respect to the center of the lens holder 1; a point of action A of the driving force generated when driving the actuator movable unit in the tracking direction is located at substantially the center of the lens holder 1 in the light axis direction of the objective lens; and the center of gravity G of the actuator movable unit deviates from the point of action A of the tracking drive of the actuator movable unit in the light axis direction of the objective lens. Therefore, when the actuator movable unit is driven in the tracking direction, a force causing generation of rolling R is generated in the radial direction of a disc in the actuator movable unit.

When the tracking drive signal is supplied to each tracking coil 6, the tracking drive signal is also supplied to each first rolling canceling coil 9 and each second rolling canceling coil 10 linked to the tracking coils 6. When the tracking drive signal is supplied to each first rolling canceling coil 9 and each second rolling canceling coil 10, the lens holder 1 is driven in the opposite focus directions with respect to the side thereof disposed with the first rolling canceling coils 9 and the side thereof disposed with the second rolling canceling coils 10. Therefore, the actuator movable unit is driven in the radial skew direction corresponding to the polarity of the tracking drive signal by a displacement amount according to the current amount of the tracking drive signal.

With regard to the driving force generated in the radial skew direction in the actuator movable unit by supplying the tracking drive signal to each first rolling canceling coil 9 and each second rolling canceling coil 10: the magnitude thereof corresponds to the rolling amount generated in accordance with the driving force generated in the tracking direction in the actuator movable unit when supplying the tracking drive signal to each tracking coil 6; and the direction thereof in the radial skew direction is set to be opposite to the rolling direction generated in accordance with the driving force in the tracking direction generated in the actuator movable unit when supplying the tracking drive signal to each tracking coil 6.

Therefore, when the tracking drive signal is supplied to each tracking coil 6 and a force Fr causing generation of the rolling is generated in the actuator movable unit as shown in FIG. 9, the tracking drive signal is concurrently supplied to each first rolling canceling coil 9 and each second rolling canceling coil 10; a driving force Fc is generated by supplying the tracking drive signal to each first rolling canceling coil 9 and each second rolling canceling coil 10 and acts so as to cancel the rolling generated when the actuator movable unit is driven in the tracking direction; and consequently the generation of the rolling due to the displacement of the actuator movable unit in the tracking direction is prevented.

Although each first rolling canceling coil 9 and each second rolling canceling coil 10 are wound to be superposed on each first focus coil 7 and each second focus coil 8 in the above embodiment, the rolling canceling coils are wound to be superposed on either or both of the first tilt coil 11 and the second tilt coil 12 in another embodiment. If the rolling canceling coils are wound to be superposed on both the first tilt coil 11 and the second tilt coil 12, a relationship between directions of the drive signals supplied to the rolling canceling coils superposed respectively on the first tilt coil 11 and the second tilt coil 12 is conformed to the relationship between directions of the drive signals supplied respectively to the first tilt coil 11 and the second tilt coil 12.

The tracking drive signal is supplied to the rolling canceling coils wound to be superposed on either or both of the first tilt coil 11 and the second tilt coil 12 and, as a result, the driving force is generated in the tilt direction that cancels the rolling when the actuator movable unit is driven in the tracking direction.

The above embodiments are for the purpose of facilitating the understanding of the present invention and are not to be construed as limiting the scope of the present invention. The present invention may variously be changed/altered without departing from the spirit thereof and encompasses the equivalents thereof.

It is claimed:

1. An objective lens driving apparatus comprising:
   an actuator movable unit including a lens holder holding at least one objective lens and a plurality of driving coils, wherein
      the lens holder is supported on an actuator frame displaceably and elastically, and
      the lens holder has parallel first and second side surfaces which each support driving coils including a tracking coil centered on each side surface and a first focus coil and a second focus coil disposed to opposite sides of the tracking coil along a tracking direction on each side surface;
   a magnetic circuit that includes a first magnet and a second magnet fixed to the actuator frame to form an effective magnetic field for the plurality of driving coils, the first and second magnets facing the first and second side surfaces of the lens holder, respectively; and
   a rolling canceling coil that is so mounted on the lens holder as to act on the effective magnetic field formed by the magnetic circuit such that a driving force is generated in a tilt direction that cancels rolling generated when a drive signal is supplied to the tracking coils to drive the actuator movable unit in the tracking direction,
   wherein the first and second side surfaces, the respective driving coils, and the rolling cancelling coil are disposed symmetrically with respect to a virtual line passing through a light axis of the objective lens in the tracking direction,
   wherein respective winding center axes of the tracking coils and the rolling canceling coil are orthogonal to the light axis of the objective lens, and
   wherein the first magnet and the second magnet include regions of opposite magnetic polarity such that each tracking coil faces a boundary between regions of opposite magnetic polarity parallel to the light axis of the objective lens and the rolling canceling coil faces a boundary between regions of opposite magnetic polarity orthogonal to the light axis of the objective lens.

2. The objective lens driving apparatus of claim 1, wherein a winding center axis of the rolling canceling coil is located at a position deviating from the gravity center of the actuator movable unit in the tracking direction.

3. The objective lens driving apparatus of claim 1, wherein the drive signal supplied to the tracking coils is also supplied to the rolling canceling coil.

4. The objective lens driving apparatus of claim 1, wherein each of the first and second side surfaces of the lens holder supports first and second rolling canceling coils with respective winding center axes thereof orthogonal to the light axis of the objective lens, the first and second rolling canceling coils disposed on both sides of the tracking coil, and wherein driving forces are generated in focus directions opposite to each other respectively in the first and the second rolling canceling coils when the actuator movable unit is driven in the tracking direction.

5. The objective lens driving apparatus of claim 4, wherein each first rolling canceling coil and each second rolling canceling coil faces a boundary between regions of opposite magnetic polarity orthogonal to the light axis of the objective lens.

6. The objective lens driving apparatus of claim 4, wherein the tracking coil and the first and the second rolling canceling coils are sequentially wound.

7. The objective lens driving apparatus of claim 1, wherein on each of the first and second side surfaces of the lens holder, a first rolling canceling coil is disposed on the first focus coil in superposed relation, and a second rolling canceling coil is disposed on the second focus coil in superposed relation.

8. The objective lens driving apparatus of claim 1, wherein the first magnet and the second magnet are set symmetrically with respect to the virtual line passing through the light axis of the objective lens in the tracking direction.

9. The objective lens driving apparatus of claim 8, further comprising:
a first tilt coil and a second tilt coil wound on the lens holder, both the first and second tilt coils having a winding axis parallel to the light axis of the objective lens, the first and second tilt coils being positioned spaced apart along the light axis direction of the objective lens, wherein
drive signals are supplied to the first tilt coil and the second tilt coil in directions opposite to each other, and wherein
effective side areas of the first tilt coil and the second tilt coil are opposed to the magnetic pole surfaces of the magnet, which are different from each other in polarity, so that tilt drive can be performed in a radial skew direction.

10. The objective lens driving apparatus of claim 9, wherein
the rolling canceling coil comprises first and second rolling canceling coils, the effective side areas of the first and the second rolling canceling coils set at positions in substantially superposed relation with the first and second tilt coils, respectively.

11. The objective lens driving apparatus of claim 10, wherein
the tracking coil and the first and the second rolling canceling coils are linked along either the first or the second tilt coil.

12. The objective lens driving apparatus of claim 10, wherein
the rolling canceling coils are wound to be superposed on either or both of the first tilt coil and the second tilt coil, and wherein
a tracking drive signal is supplied to the rolling canceling coils.

13. An objective lens driving apparatus, comprising:
an actuator movable unit comprising:
a lens holder configured to hold at least one objective lens, the lens holder supported on an actuator frame displaceably and elastically, and
a plurality of driving coils supported by the lens holder;
a magnetic circuit that includes a magnet fixed to the actuator frame to form an effective magnetic field for the plurality of driving coils;
wherein the plurality of driving coils includes:
a tracking coil to drive the actuator movable unit in a tracking direction
a rolling canceling coil that is so mounted on the lens holder as to act on the effective magnetic field formed by the magnetic circuit so effectively that a driving force is generated in a tilt direction that cancels rolling generated when a drive signal is supplied to the tracking coil; and
a first tilt coil and a second tilt coil wound on the lens holder, the first and second tilt coils having a winding center axis parallel to a light axis of the objective lens, the first and second tilt being positioned spaced apart along the light axis direction of the objective lens,
wherein drive signals are supplied to the first tilt coil and the second tilt coil in directions opposite to each other,
wherein effective side areas of the first tilt coil and the second tilt coil are opposed to the magnetic pole surfaces of the magnet, which are different from each other in polarity, so that tilt drive can be performed in a radial skew direction, and
wherein the rolling canceling coil comprises first and second rolling canceling coils, the effective side areas of the first and the second rolling canceling coils set at positions in substantially superposed relation with the first and second tilt coils, respectively.

14. The objective lens driving apparatus of claim 13, wherein
the tracking coil and the first and the second rolling canceling coils are linked along either the first or the second tilt coil.

15. The objective lens driving apparatus of claim 13, wherein
the first and second rolling canceling coils are wound to be superposed on either or both of the first tilt coil and the second tilt coil, and wherein
a tracking drive signal is supplied to the rolling canceling coils.

* * * * *